March 16, 1948.  R. B. JOHNSON ET AL  2,438,056
RATIO COMPUTING PHASE SHIFT INDICATOR
Filed Feb. 21, 1945  5 Sheets-Sheet 1

FIG.1.

INVENTORS.
Reynold B. Johnson,
Clinton E. Larrabee.
BY W. M. Wilson
ATTORNEY

March 16, 1948.　　R. B. JOHNSON ET AL　　2,438,056
RATIO COMPUTING PHASE SHIFT INDICATOR
Filed Feb. 21, 1945　　5 Sheets-Sheet 3

INVENTORS.
Reynold B. Johnson,
Clinton E. Larrabee.
BY *[signature]*
ATTORNEY

Patented Mar. 16, 1948

2,438,056

UNITED STATES PATENT OFFICE 2,438,056

RATIO COMPUTING PHASE SHIFT INDICATOR

Reynold B. Johnson and Clinton E. Larrabee, Binghamton, N. Y., assignors to International Business Machines Corporation, New York, N. Y., a corporation of New York Application February 21, 1945, Serial No. 580,004

13 Claims. (Cl. 235—61)

1

The present invention relates in general to a computing mechanism and, in particular, to a phase shift indicating device designed for use in connection with electronic radio equipment.

By way of introduction to the present invention, it is stated that the invention is adapted to be associated with a system of electronic navigation which is based on radar (range, detection and ranging) and loran (long range navigation).

Airplanes equipped with radar for checking on known points on land or within approximately 110 miles from land, have a constant and reliable system of dead-reckoning. Since radar is useless over empty expanses of water where land lies outside a one-hundred mile limit, loran is employed instead. Loran-equipped ships and planes use special receivers to pick up radio impulses from transmitters located at known points to fix their positions. These "fixes" can be made at night in any weather without visibility and are as accurate as celestial observations and are far easier to make. However, loran cannot be depended upon alone for reliable navigation but must be supplemented by full-time dead-reckoning.

Essentially, loran is a system of point location involving three fixed stations of which the central one is a "master" transmitter and the outer ones are "slave" stations which relay the signal of the master station. The out-of-phase relation of waves received from the master station and one outer station enables a distance to be established which is the difference in distance between the stations from the unknown point of reception. This difference of distance is common to the entire length of one particular hyperbola which has these two stations as foci. Thus, if the position of a group of hyperbolas is established on a map, the previously unknown point of reception is identified as being somewhere on one particular hyperbola. In identical fashion, the signal from the center and the other outer station establishes a second hyperbola upon which the unknown point is also located. Thus, if the coordinants of the intersection of these two hyperbolas can be found, the unknown point is automatically established.

The present phase shift indicator has been developed to solve a final step involved in such dead-reckoning, this step being a ratio computation which has too many digits in the components thereof to permit ready reference to a table and which ordinarily would require too much time to do by hand. The basis of loran is an oscillograph tube somewhat similar to that used in television receivers. Wave impulses from the master and slave stations "show" on this tube. Conversion of the phase difference to time difference in microseconds is the problem imposed. The present phase shift indicator is simple and compact in the extreme, yet it will make the required conversions instantly and constantly. The phase shift indicator is used to change a given apparent time difference in the reception of signals from the master and slave stations to the actual time difference. Many groups of three stations operate at the same wave length but apparently transmit their "pips" or time signals at slightly different intervals—one set of three at 400 per unit of time, another set of three at 399 per unit of time, etc., down to 393 per unit of time. A difference of one unit in reception for each of these ratios would thus represent a slightly different distance. It is this conversion of from 400:400 as read on an indicating dial or 400:399 or 400:398, etc., which the present phase shift indicator will quickly establish.

Stated otherwise, it is possible by means involving the use of a cathode ray tube in a radio receiver, to measure the linear extent of two waves arriving at the receiver from two transmitting stations which are geographically separated. Inasmuch as these wave lengths vary with the frequency, a mechanical device which indicates the difference between the waves in terms of the wave length or frequency may be caused to indicate the differences in time, and, consequently, in distance between the receiver and the two transmitters. The function of the present phase shift indicator is to provide a ready means for indicating in microseconds the difference in time at which the crest of two signals or radio waves arrive at the receivers. This difference in time can be resolved into equivalent measurements of linear distance.

According to the present invention, the phase shifting apparatus employs a pair of rotatable members, one of which is suitably connected to a variable condenser or other variable instrument associated with the cathode ray tube, and the other of which is operatively connected to selecting means for selecting predetermined transmitting stations. The two rotatable members are adapted to be manually turned from a single control knob and the amount of turning movement of the two rotating members is separately indicated upon a pair of similar counters or the like. One of the rotating members and its indicating counter is directly driven by the manual control knob, while the other rotatable member and its counter undergoes a phase shift occasioned by the provision of a variable differential drive between the two rotating members. The amount of phase shift experienced by this latter rotating member is adapted to be selectively varied by means of a mechanism which, besides varying the phase shift, also controls the selection of the transmitting stations by the receiving apparatus.

While apparatus of this type may be employed throughout a wide range of differential readings between the two counters, for purposes of illustration only the apparatus has been designed to accommodate only eight different degrees of phase shift ranging in ratios from 400 to 400 through ratios of 400 to 399, 400 to 398, 400 to 397, etc., down to a ratio of 400 to 393 inclusive. Such an arrangement is adequate for the particular navigational use for which the present invention has been designed, although it is obvious that additional ratios may be included by suitable modification of the apparatus.

The provision of an apparatus of the type set forth above which will give a visual indication of phase shift between two rotating members in order that navigational calculations may be resorted to, being the principal object of the invention, an additional object thereof is to provide an apparatus which is extremely simple in its construction and which involves a minimum number of manual controls therefor.

The provision of an apparatus which is extremely rugged and durable, one which is comprised of a minimum number of moving parts and which is consequently unlikely to get out of order, one which is comprised of relatively small parts and which is compact and of light weight construction, and one which is extremely accurate in its phase shifting computations are further desirable features that have been borne in mind in the production and development of the present invention.

Other objects of the invention will be pointed out in the following description and claims and illustrated in the accompanying drawings, which disclose, by way of example, the principle of the invention and the best mode, which has been contemplated, of applying that principle.

In the drawings.

In all of the above described views like characters of reference are employed to designate like parts throughout.

Figure 1:
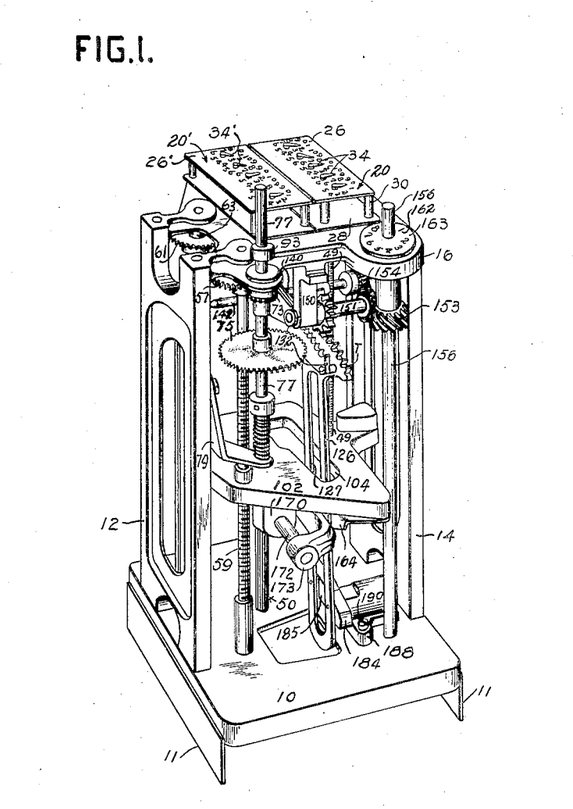
Fig. 1 is a perspective view of a phase shift indicating device constructed in accordance with the principles of the present invention.

Referring now to the drawings in detail and in particular to Fig. 1, the apparatus involves in its general organization a lower base or platform 10 which is generally of rectangular form and which may be provided with suitable supporting plates 11, by means of which it may be supported from the floor or other supporting surface. A front standard 12 and a rear standard 14 extend upwardly from the base plate 10 on opposite sides thereof and serve to support therebetween an upper top frame member 16.

Figure 4:
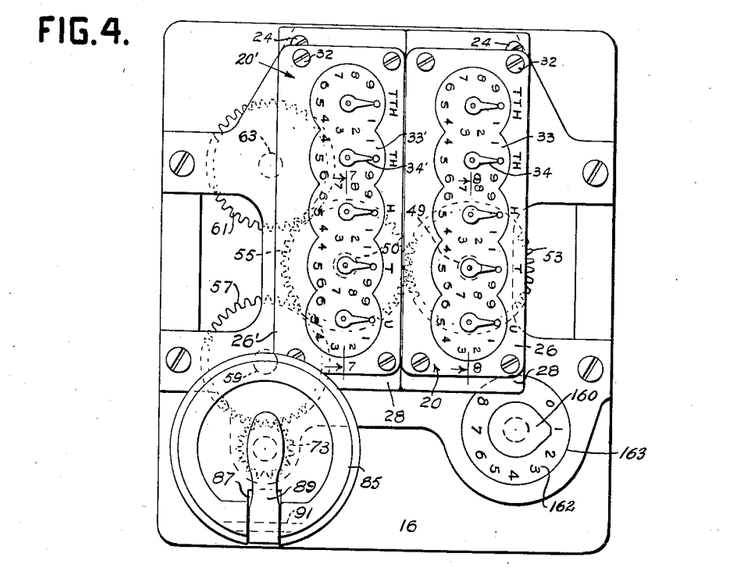
Fig. 4 is a top plan view of the apparatus.

A plurality of spacing sleeves 18 serve to support thereon a pair of counter assemblies 20 and 20' (Figs. 1 and 4), which assemblies may be identical in construction. These counter assemblies are securely held in spaced position above the level of the top frame member 16 by means of clamping bolts 24 or the like. The two identical counter assemblies 20 and 20' are more or less conventional in design and no claim is made herein to any novelty associated with them. Because of their similarity, it is thought that a description of one will suffice for them both. To distinguish between the two counter assemblies, the corresponding parts thereof have been given similar characters of reference, but in the case of the counter 20' the characters have primed suffixes applied thereto.

Each counter assembly includes an upper face plate 26 (Figs. 1, 2, 3 and 4) and a lower backing plate 28, which plates are fastened together in spaced relation by means of spacing collars 30 and clamping bolts 32. Each counter assembly is designed to accommodate five digits, namely, the units, tens, hundreds, thousands and ten-thousands digits and accordingly the face plate 26 is provided with five dials 33 having associated therewith respective dial pointers 34, each of which is carried upon a vertical shaft 36. The raised dials 33 and 33' have been labeled U, T, H, TH and TTH to correspond to the units, tens, hundreds, thousands and ten-thousands numerical orders respectively which they represent. The five shafts 36 are permanently geared together in the usual manner of gearing for each counter assembly by means of suitable gearing 38. Thus, each shaft 36 is geared to the shaft which controls the movement of the dial pointer of the next lowest order by a 10:1 ratio.

Figure 6:
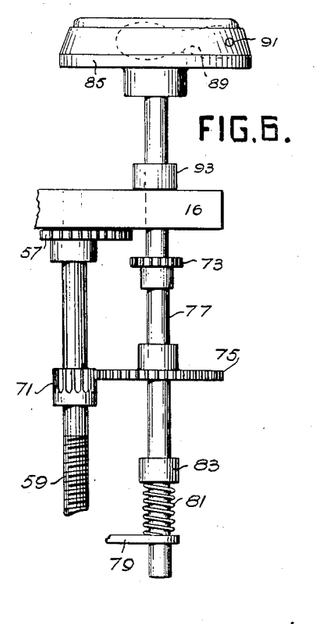
Fig. 6 is a fragmentary side elevational view of a portion of the apparatus as shown in Fig. 2 with the parts thereof in a different position.
Figure 8:
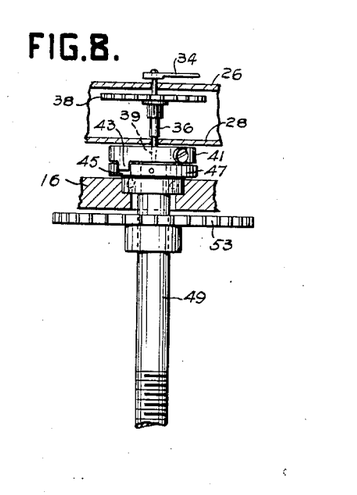
Fig. 8 is a fragmentary detailed side elevational view, partly in section, of a differential unit employed in connection with the present invention.

In the case of the counter 20, the shaft 36 which accommodates the tens dial is adapted to be positively driven from a manually operable driving mechanism, shown in Fig. 6. Toward this end, the lower end of the shaft 36, which carries the tens pointer, passes down through the lower backing plate 28 as at 39 (Fig. 8) and has clamped thereon a split collar 41 provided with a downwardly extending finger 43 which extends into a slot 45 formed in a second split collar 47 which is forced onto the upper end of an elongated vertical rod 49, the lower end of which rod is rotatably supported in anti-friction bearings 51 carried in the base member 10.

A driving gear 53 is mounted on the rod 49 immediately below the top frame member 16 and is designed for meshing engagement with a central differential gear 55 (Fig. 4), the mounting, nature and function of which will be set forth presently. The gear 55 is adapted to be driven from a gear 57 carried near the upper end of a threaded rod 59, similar to the rod 49 and similarly supported between the top frame member 16 and the base plate 10. The gear 55 also meshes with a gear 61 likewise carried near the top of a third rod 63 similar to the rod 49 and similarly mounted in the apparatus.

A second and smaller driving gear 71 (see Fig. 6) is mounted on the rod 59 below the gear 57 and the two gears 57 and 71 are adapted to be selectively driven from a relatively small gear 73 and a relatively large gear 75 respectively, which latter gears are mounted on a drive shaft 77 rotatably and slidably journaled at its upper end in the top frame member 16 and at its lower end in a bracket 79 secured to the rear standard 14. A coil spring 81 surrounding the shaft 77 bears at its upper end against a collar 83 affixed to the shaft and bears at its lower end against the bracket 79, thus normally urging the slidable rotatable shaft 77 to its uppermost position wherein the small driving gear 73 meshes with the gear 57 and wherein the large driving gear 75 is out of mesh with the gear 71.

A knurled crank head 85 is affixed to the upper end of the drive shaft 77 and the knurling on the periphery of this head affords a ready means for relatively slow manual turning of the drive shaft. The crank head 85 is recessed as at 87 to afford a clearance space for a foldable handle 89 which is pivoted as at 91 to the crank head near the periphery thereof and which is adapted to be moved from its folded dotted line position in the crank head to its vertical full line position. The handle 89 is adapted to be moved to its vertical position and manipulated by a wrist motion to obtain rapid turning movement of the drive shaft 77. Whether the knurled portion of the crank head 85 or the handle 89 be employed, it is a comparatively easy matter to apply downward pressure to the shaft 77 to cause disengagement of the gears 57 and 73 and engagement of the gears 71 and 75 for speed change purposes. The handle 89 may be folded within the recessed portion 87 when the knurled periphery of the crank head 85 is utilized for adjusting purposes.

Figure 7:
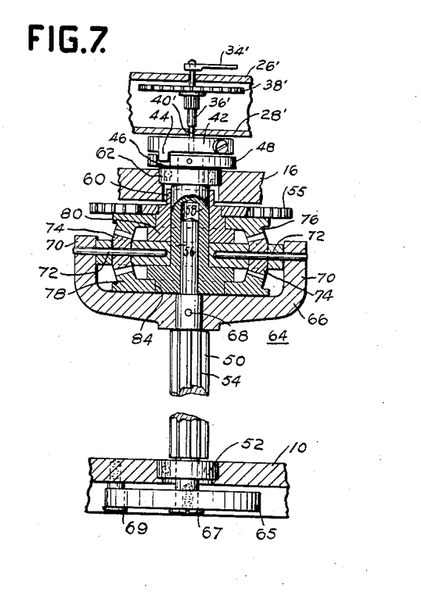
Fig. 7 is a sectional view taken substantially along the line 7—7 of Fig. 4.

In the case of the counter 29', the counter mechanism is adapted to be differentially driven and, toward this end, the shaft 36' (Figs. 2 and 7) for the tens dial is extended downwardly as at 40' through the plate 28 and has clamped thereto a split collar 42 having a downwardly extending finger 44 which projects into a peripheral slot 46 formed on a second collar 48. This latter collar is mounted on and secured to the upper end of a hollow sleeve 58 having a reduced portion 60, by means of which it is rotatably journaled in anti-friction bearings 62 mounted within the top frame member 16. The hollow sleeve 58 is loose and rotatably receives the upper end of a vertically extending shaft 50 which extends between the base plate 10 and the top of the frame member 16 and which is journaled at its lower end in anti-friction bearings 52 (Fig. 7).

The lower end of the shaft 50 projects completely through the anti-friction bearing 52 and has affixed thereto the inner end of a convolute coil spring 65 which is anchored by means of a clamping screw 67. The outer end of the coil spring 65 is anchored by means of a clamping screw 69 to the underneath side of the base plate 10. The coil spring 65 is so tensioned as to take up any slack which may exist between the splined portion of the shaft 50 and a rack with which it meshes and the nature of which will be described hereinafter.

The hollow sleeve 58 constitutes the driven or output element of a differential unit designated in its entirety at 64 and this latter unit further includes a housing or spider 66 which constitutes one of two input elements for the differential gear. The spider 66 is pinned or otherwise secured as at 68 to the splined shaft 50. The spider 66 is formed with a plurality of upstanding arms 70, each of which carries an inwardly projecting stud 72 on which there is mounted a beveled pinion 74. The pinions 74 are adapted to ride between upper and lower ring gears 76 and 78 respectively, the former being loosely mounted on a floating sleeve 80, which in turn is loosely disposed on the output sleeve 58. The ring gear 76 is also secured in any suitable manner to the gear 55, which latter gear constitutes a second input element for the differential unit 66. The ring gear 78 is pressed upon or otherwise secured to a reduced portion 84 formed at the lower end of the sleeve 58.

From the above description it will be seen that the particular reading on the tens dial of the counter assembly 29' is dependent upon the angular position of the gear 55, as well as upon the angular position of the spider 66 and splined shaft 50 upon which it is mounted. In other words, the angular position of the pointer associated with the tens dial of the counter assembly 29', as controlled by the angular position of the gear 55, is modified through the differential unit 64 according to the angular position of the splined shaft 50.

Figure 3:
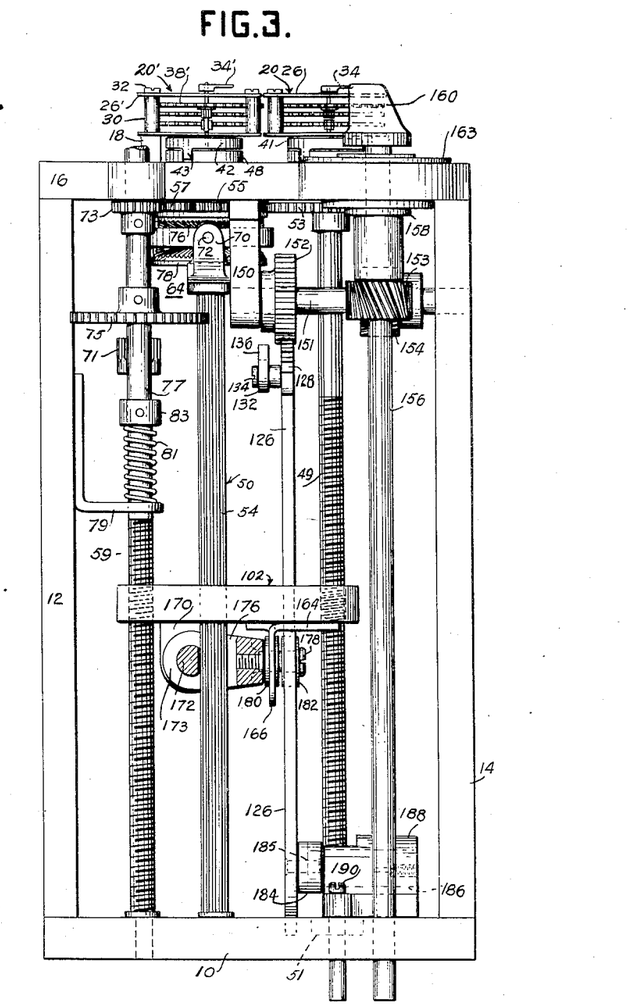
Fig. 3 is a side elevational view thereof.
Figure 9:
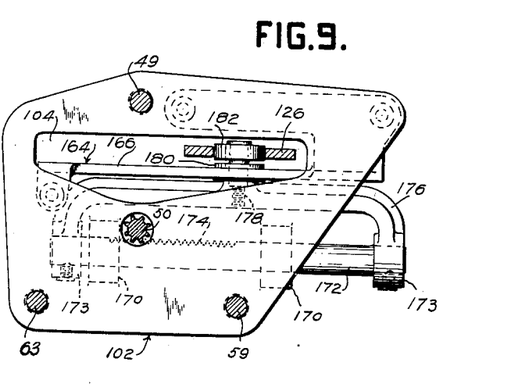
Fig. 9 is a sectional view taken substantially along the line 9—9 of Fig. 2, and illustrating a carriage assembly employed in connection with the present invention.
Figure 10:
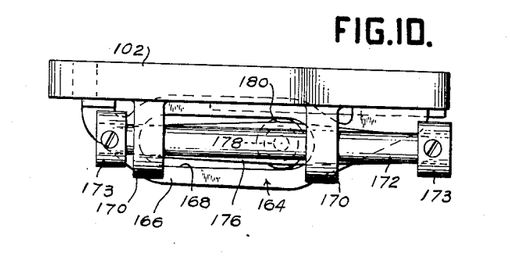
Fig. 10 is a side elevational view of the carriage assembly shown in Fig. 9.
Figure 11:
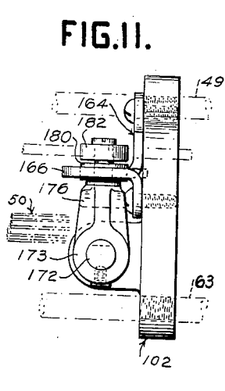
Fig. 11 is an end elevational view of the carriage assembly.

Referring now to Fig. 3, each of the three rods 49, 59 and 63 is threaded as at 100 from a point near the bottom thereof to a point in the medial region thereof and these threaded portions serve to adjustably support therebetween a vertically movable carriage 102 (see also Figs. 9, 10 and 11). The carriage 102 is in the form of a substantially flat casting in which there is formed an opening or slot 104, through which opening there projects a tiltable arm 126 having a gear segment 128 formed adjacent its upper end. The lower end of the arm 126 is pivotally supported from the base 10 in a manner that will be described subsequently. A slot 127 is formed in the arm 126 and extends from a point very near the bottom thereof to a point very near the top thereof.

A narrow offset plate 132 is secured by means of screws 134 to one side of the segment 128 and is formed with a series of eight depressions 136 in the upper edge thereof. The depressions 136 are designed for cooperation with a finder roller 138 carried between the outer ends of a pair of spaced arms 140, these arms being pivoted medially of their ends on a cross rod 142 suitably secured to the framework of the apparatus. A spring 144 has its lower end anchored in an aperture 145 (Fig. 2) in one of the arms 140 and has its upper end anchored to the underneath side of the top frame member 16. Thus it will be seen that the finder roller 138 is normally biased against the upper surface of the offset plate 132 so that it will seek a position of rest within one of the eight depressions 136 and thus hold the arm 126 tilted in any one of eight different positions of angularity with respect to the vertical.

Figures 2, 5:
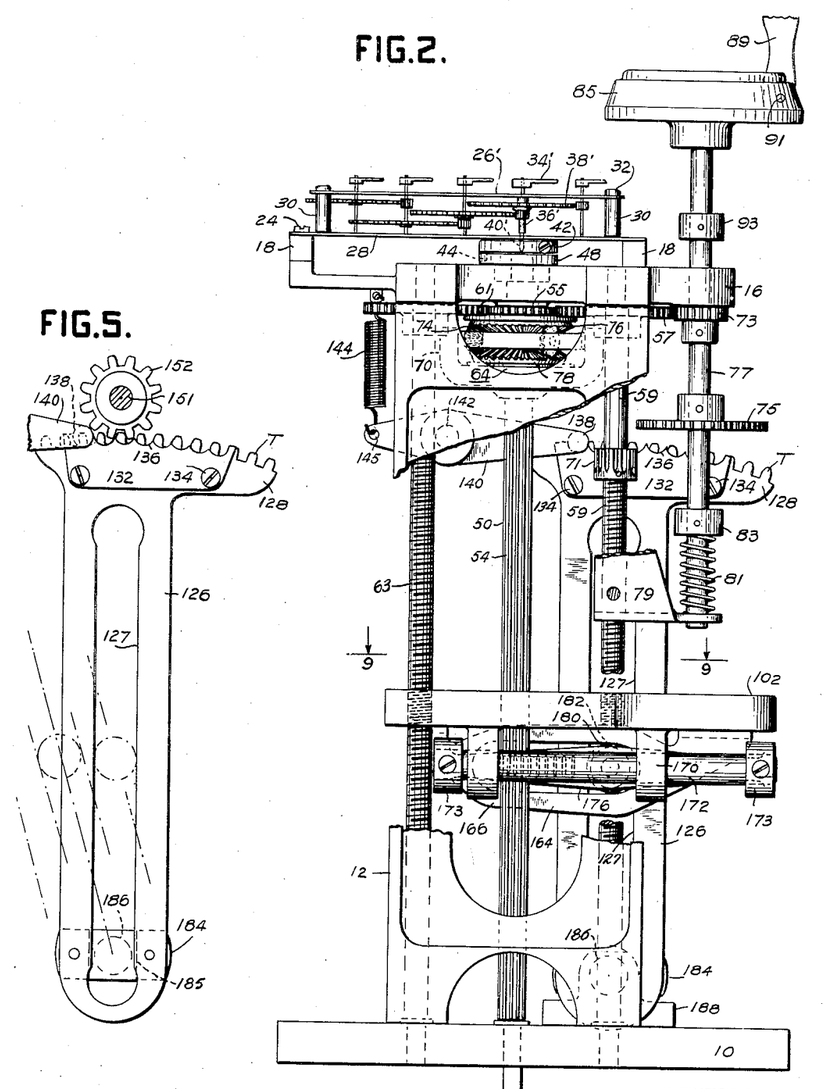
Fig. 2 is a front elevational view of the apparatus, certain parts being broken away to more clearly reveal the nature of the invention.
Fig. 5 is a detailed fragmentary view of the apparatus showing a rack and pinion mechanism employed in connection with the present invention.

Referring now to Figs. 1, 3 and 5, a bracket 150 depends downwardly from the underneath side of the top frame member 16 and has one end of a horizontal shaft 151 rotatably journaled therein. The other end of the shaft 151 is rotatably journaled in the standard 14 near the upper end thereof. The shaft 151 has mounted thereon a pinion 152 which meshes with the gear segment 128, as shown in Fig. 5. The shaft 151 also carries a worm gear 154 which meshes with a similar worm gear 153 mounted on a vertical shaft 156, the lower end of which is rotatably journaled in the base plate 10 and the upper end of which is rotatably mounted in anti-friction bearings 158 carried in the top frame member 16. A pointer 160 is affixed to the upper end of the shaft 156 and is adapted to cooperate with a series of indicia 162 formed on a circular plate 163 mounted on the upper surface of the top frame member 16 and surrounding the shaft 156. Because of the fact that there are eight depressions in the upper edge of the offset plate 132 and eight consequent angular positions of which the slotted arm 126 is capable, eight corresponding indicia marks 162 are formed on the plate 163 and the pointer 160 is capable of being turned angularly to register with any one of the indicia 162. Turning movement of the pointer 160 transmits motion through the shaft 156, gears 154, 153, shaft 151, pinion 152 and gear segment 128 to impart a selected angular position to the slotted arm 126 for a purpose that will now be set forth. These angular positions are exemplified by means of dotted lines in Fig. 5 representing different counter ratios ranging from 400:400 (i. e., 1:1) through 400:399, 400:398, etc., to 400:393. While only eight such angular positions for the slotted arm 126 have been shown in the present instance, it will be distinctly understood that the slotted arm may, by suitable modification, be capable of assuming a greater or lesser number of such angular positions depending upon the number of changeable ratios desired. As previously explained, the present differentiating counter has been designed for a specific purpose requiring only eight ratio changes and this number of ratio changes is deemed adequate to illustrate the principles of the present invention.

The detailed construction of the carriage 102 is best illustrated in Figs. 9, 10 and 11. In these figures, an angular bracket 164 is secured to the underneath side of the carriage and is provided with a downwardly extending flange 166 having an elongated horizontal slot 168 formed therein. A pair of spaced bearing blocks 170 depend from the underneath side of the carriage 102 and serve to slidably support therebetween a rod or rack member 172 which is formed with a series of teeth 174 on one side thereof extending from one end of the rod inwardly to a medial point. The teeth 174 on the rod 172 are designed for meshing engagement with the splined portion 54 of the vertically extending shaft 50. The rod or rack 172 is connected at its opposite ends to a pair of hubs 173 formed on a yoke member 176 from the medial regions of which there projects a short stud 178, on which stud there is disposed a pair of freely and independently rotatable rollers 180 and 182. The roller 180 is received within the slot 168 provided in the depending flange 166 of the angular bracket 164, while the roller 182 is received within the elongated slot 127 formed in the tiltable slotted arm 126. From the above description it will be seen that, depending upon the particular angular position of the slotted arm 126, vertical movement of the carriage 102 will cause lateral shifting movement of the yoke 176 in one direction or the other. Such lateral shifting movement of the yoke 176 will cause axial movement of the rack or rod 172 and consequent rotary turning movement of the splined shaft 50. Such turning movement of the shaft 50 in one direction or the other will operate through the previously described differential unit 64 to vary the normal setting of the pointers associated with the counter assembly 20', all in a manner and for a purpose subsequently to be set forth.

For reasons that will appear presently, it is necessary that when the carriage 102 is in its lowermost position on the supporting rods 49, 59 and 63 near the bottom of the machine, that the outer roller 182 occupy a position which is concentric with the pivotal axis of the tiltable slotted arm 126. Toward this end, a special pivotal mounting for the tiltable slotted arm must be provided. Such a mounting is shown in Figs. 1 and 3. The mounting includes a cross piece 184 which extends across the slot 127 and which is provided with a cylindrical stub shaft 186 that extends into a bearing member 188 mounted on the base plate 10 and suitably secured thereto by means of studs 190. The cross piece 184 is recessed as at 185 to afford a clearance for the roller 182 and thus this latter member is capable of movement coextensively within the slot 127 from a lowered position, wherein its axis of rotation commences with the axis of the tilting movement of the arm 126, to an upper position wherein it occupies a position in close proximity to the upper end of this slot.

The apparatus when considered purely as a computing mechanism is capable of being used in several different manners. However, when used for navigational purposes, as outlined in the preamble to this specification, the shaft 156 which carries the rate selecting pointer 160 is connected in any suitable manner, as for example, by a flexible shaft or by gearing, not shown, into a signal receiving apparatus for the purpose of making station selections. Thus it will be seen that as certain stations are selected, the ratio of movement between the counters 20 and 20' upon manipulation of the crank head 85 will be set to one of the eight designated ratios. One of the three carriage elevating shafts, preferably the rod 49, is connected into the electronic equipment associated with the previously mentioned cathode ray tube by means of which the incoming radio waves are balanced, whereupon upon turning of the crank head 85 manually the two counters 20 and 20' are set into motion. Such motion may, by proper selection of the mating gears 57, 73, or 71, 75, as the case may be, be a fast motion or a slow motion. The operator by watching the indications of the cathode ray tube and by turning of the crank head 85 will determine a point of balance, at which time the counter 20 will render a particular reading, while the counter 20' will render a slightly different reading commensurate with the particular selected ratio as determined by the setting of the control pointer 160. When such a condition has been attained, the operator may take a reading of the counter 20' and by referring to his navigational charts perform the computations required of him in determining his relative position.

It is to be noted that the manually operable driving mechanism, the details of which are best illustrated in Fig. 6, serves to directly drive the shaft 36 which controls the movement of the pointer associated with the tens dial of the counter assembly 20. This expedient is resorted to simply to reduce the number of revolutions which it would be necessary to apply to the knurled crank head 85 if the drive were applied to the units dial pointer to produce a given computation, the reduction, of course, being in the ratio of 10:1. Additionally, the number of revolutions which the differential unit shown in Fig. 7 is required to make to produce a correction is similarly reduced.

As stated above, the angular positions of the slotted arm represent different counter ratios ranging from 400:400 down to 400:393 with eight angular positions of the slotted arm being provided for by the eight depressions in the upper edge of the offset plate 132. Taking, for example, an instance wherein it is desired that a ratio of 400:393 shall exist between the reading of the two counter assemblies 20 and 20', the counter 20 may be specified to register 12,000 units. At the above ratio, the revised reading of the counter 20' is 11,790 units or a difference of 210 units.

A correction of 210 units is equivalent to 2.1 turns of the tens shaft 36' which in turn is equivalent to 1.05 turns of the differential housing or spider 66. The differential spider 66 (Fig. 7) is directly mounted on the splined shaft 50, this shaft being the equivalent of a pinion gear which is of .250 inch pitch diameter. One complete revolution of the splined shaft 50 requires a lateral movement of the rack 172 (Figs. 9, 10 and 11), guide frame 176 and roller 182 which is equal to the circumference of the splined shaft at its pitch line. Thus:

$$\pi \times .250 = .78540$$

A correction of 1.05 revolutions is thus equal to: $1.05 \times .78540 = .82467$ inch lateral movement of the rack, guide frame and roller.

It should be borne in mind that this figure is the correction applied at a reading of 12,000 units on the basis of a 400:393 ratio. At zero reading the correction would be zero. At a reading of 6,000 units the correction would be one-half. Thus a straight line characteristic from zero is established as required for this or any other ratio, according to the sine bar principle.

The arbitrary figure 12,000 represents 120 turns of the tens shaft. The vertically traveling carriage 102 is acted on by lead screws 49, 59 and 63 which have a lead of .025 inch per turn (i. e., 40 threads per inch). A total rise of 3 inches of the carriage 102 is thus attained for 12,000 units change in the reading of the counters.

The angle of the tiltable arm 126 (i. e., sine bar) which controls the movement of the roller 182 and associated parts should have a tangent equal to the ratio of .82467 inch:3 inches or an angle of 15° 22' 10".

A suitable notch is arranged in the offset plate 132 mounted on the tiltable arm or sine bar 126 (Fig. 5) to obtain this angle. By means of similar computations, the angles and, consequently, the positions of the notches for other ratios such as 400:399, 400:398, etc., may be determined.

It is to be distinctly understood that the above specific arbitrarily chosen ratios and dimensions of parts represent conditions that obtain for certain practical navigational problems, such as have been outlined above. The apparatus may, if desired, be constructed to accommodate other ratios in greater or lesser number and in such instances other dimensions for the various parts of the unit may be selected. However, in any instance, the mathematical principles involved remain substantially the same.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In an apparatus of the character described, a manually rotatable driving shaft and a driven shaft, rotary differential gear means for imparting motion from said driving shaft to said driven shaft, said differential means comprising a pair of input elements and an output element connected to said driven shaft, gear means directly connecting said driving shaft to one of said input elements, a worm shaft operatively connected to said gear means and adapted to be driven thereby, a carriage mounted on said worm shaft and movable therealong upon rotation of the latter, a splined shaft connected to said other input element and mounted for rotation therewith, a rack slidably mounted on said carriage and having a toothed portion in meshing engagement with said splined shaft, and cam means operable upon movement of said carriage along said worm shaft during rotation thereof for shifting the position of said rack laterally to impart a component of motion to said latter input gear.

2. In an apparatus of the character described, a manually rotatable driving shaft and a driven shaft, rotary differential gear means for imparting motion from the former to the latter, said differential means comprising a pair of rotary input elements and a rotary output element connected to said driven shaft, plural means selectively connecting said driving shaft and one of said input elements in driving relationship whereby upon rotation of the former the latter will be rotated at predetermined selected rates of rotation, a worm shaft operatively connected to said gear means and adapted to be driven thereby, a carriage mounted on said worm shaft and movable therealong upon rotation of the latter, a splined shaft connected to said other input element and mounted for rotation therewith, a rack slidably mounted on said carriage and having a toothed portion in meshing engagement with said splined shaft, and cam means operable upon movement of said carriage along said worm shaft for shifting the position of said rack laterally to impart a rotary component of motion to said latter input element.

3. In an apparatus of the character described, a manually rotatable driving shaft and a driven shaft, rotary differential gear means for imparting motion from the former to the latter, said differential means comprising a pair of rotary input elements and a rotary output element connected to said driven shaft, plural means selectively connecting said driving shaft and one of said input elements in driving relationship whereby upon rotation of the former the latter will be rotated at predetermined selected rates of rotation, a worm shaft operatively connected to said gear means and adapted to be driven thereby, a carriage mounted on said worm shaft and movable therealong upon rotation of the latter, a splined shaft connected to said other input element and mounted for rotation therewith, a rack slidably mounted on said carriage and having a toothed portion in meshing engagement with said splined shaft, a cam protuberance mounted on said rack, a tiltable member having a rectilinear slot formed therein into which said cam protuberance extends, and means for varying the inclination of said tiltable member.

4. In an apparatus of the character described, a manually rotatable driving shaft and a driven shaft, rotary differential gear means for imparting motion from the former to the latter, said differential means comprising a pair of rotary input elements and a rotary output element connected to said driven shaft, plural means selectively connecting said driving shaft and one of said input elements in driving relationship whereby upon rotation of the former the latter will be rotated at predetermined selected rates of rotation, a worm shaft operatively connected to said gear means and adapted to be driven thereby, a carriage mounted on said worm shaft and movable therealong upon rotation of the latter, a splined shaft connected to said other input element and mounted for rotation therewith, a rack slidably mounted on said carriage and having a toothed portion in meshing engagement with said splined shaft, a tiltable member having an elongated rectilinear cam slot formed therein, means for maintaining said member in any one of a plurality of different angular positions, and a cam protuberance mounted on said rack and projecting into said cam slot.

5. In an apparatus of the character described, a manually rotatable driving shaft and a driven shaft, differential gear means for imparting motion from said driving shaft to said driven shaft, said differential means comprising a pair of rotary input elements and a rotary output element connected to said driven shaft, gear means directly connecting said driving shaft to one of said input elements, a worm shaft operatively connected to and adapted to be driven by said gear means, a carriage mounted on said worm shaft and movable therealong upon rotation of the latter, a splined shaft connected to said other input element and mounted for rotation therewith, a rack slidably mounted on said carriage and having a toothed portion in meshing engagement with said splined shaft, a tiltable cam element capable of assuming a plurality of different positions of angularity with respect to said worm shaft, there being an elongated rectilinear slot formed in said tiltable cam element, a cam protuberance mounted on said rack and extending into said slot, and means for selectively moving said movable cam element to any one of its angular positions.

6. In an apparatus of the character described, a vertically disposed rotatable worm shaft, means for manually rotating said worm shaft, a second shaft adapted to be driven from said worm shaft, differential gear means connecting the two shafts and comprising a pair of rotary input elements and a rotary output element connected to said driven shaft, a carriage mounted on said worm shaft and movable therealong upon rotation of the latter, a splined shaft connected to one of said input elements and mounted for rotation therewith, a rack slidably mounted on said carriage and having a toothed portion in meshing engagement with the splined shaft, cam means operable upon movement of said carriage along said worm shaft for shifting the position of said rack relative to the carriage to impart a component of motion to the splined shaft, and means for directly driving said other input element from said worm shaft.

7. In an apparatus of the character described, a pair of counter mechanisms each including a plurality of numerical counter units representative of different digital orders and including a pointer, manually operable means for driving corresponding pointers of each unit simultaneously at different rates of speed comprising a manually rotatable worm shaft, gear means operatively connecting said worm shaft to one of said pointers in direct driving relationship, and differential gear means operatively connecting said worm shaft to the other pointer in driving relationship, said latter means including a pair of rotary input elements and a rotary output element directly connected to said latter pointer, means operatively connecting said worm shaft to one of said input elements in direct driving relationship, a carriage mounted on said worm shaft and movable axially therealong upon rotation of the latter, a rotatable splined shaft secured to and rotatable with said other input element, a rack slidably mounted on said carriage and having a toothed portion in engagement with said splined shaft, and cam means for shifting the position of said rack relative to the carriage upon movement of the latter along said worm shaft.

8. In an apparatus of the character described, a pair of counter mechanisms each including a plurality of numerical counter units representative of different digital orders and including a pointer, manually operable means for driving corresponding pointers of each unit simultaneously at different rates of speed comprising a manually rotatable worm shaft, gear means operatively connecting said worm shaft to one of said pointers in direct driving relationship, and differential gear means operatively connecting said worm shaft to the other pointer in driving relationship, said latter means including a pair of rotary input elements and a rotary output element directly connected to said latter pointer, means operatively connecting said worm shaft to one of said input elements in direct driving relationship, a carriage mounted on said worm shaft and movable axially therealong upon rotation of the latter, a rotatable splined shaft secured to and rotatable with said other input element, a rack slidably mounted on said carriage and having a toothed portion in engagement with said splined shaft, a tiltable cam member capable of assuming different positions of angularity, there being an elongated rectilinear slot in said cam member, and a cam roller mounted on said carriage and projecting into said slot.

9. In an apparatus of the character described, a pair of counter mechanisms each including a plurality of numerical counter units representative of different digital orders and including a pointer, manually operable means for driving corresponding pointers of each unit simultaneously at different rates of speed comprising a manually rotatable worm shaft, gear means operatively connecting said worm shaft to one of said pointers in direct driving relationship, and differential gear means operatively connecting said worm shaft to the other pointer in driving relationship, said latter means including a pair of rotary input elements and a rotary output element directly connected to said latter pointer, means operatively connecting said worm shaft to one of said input elements in direct driving relationship, a carriage mounted on said worm shaft and movable axially therealong upon rotation of the latter, a rotatable splined shaft secured to and rotatable with said other input element, a rack slidably mounted on said carriage and having a toothed portion in engagement with said splined shaft, a tiltable cam member capable of assuming different positions of angularity relative to said worm shaft, there being an elongated rectilinear slot in said cam member, a cam roller carried by said carriage and projecting into said slot, and means for selectively moving said cam member to any one of its positions of angularity.

10. In an apparatus of the character described, a pair of counter mechanisms each including a plurality of numerical counter units representative of different digital orders and including a pointer, manually operable means for driving corresponding pointers of each unit simultaneously at different rates of speed comprising a manually rotatable worm shaft, gear means operatively connecting said worm shaft to one of said pointers in direct driving relationship, and differential gear means operatively connecting said worm shaft to the other pointer in driving relationship, said latter means including a pair of rotary input elements and a rotary output element directly connected to said latter pointer, means operatively connecting said worm shaft to one of said input elements in direct driving relationship, a carriage mounted on said worm shaft and movable axially therealong upon rotation of the latter, a rotatable splined shaft secured to and rotatable with said other input element, a rack slidably mounted on said carriage and having a toothed portion in engagement with said splined shaft, a tiltable cam member capable of assuming different positions of angularity relative to said worm shaft, there being an elongated rectilinear slot in said cam member, a cam roller carried by said carriage and projecting into said slot, means for selectively moving said cam member to any one of its positions of angularity, and holding means for retaining said cam member in any selected position.

11. In an apparatus of the character described, a pair of counter mechanisms each including a plurality of numerical counter units representative of different digital orders and including a pointer, manually operable means for driving corresponding pointers of each unit simultaneously at different rates of speed comprising a manually rotatable worm shaft, gear means operatively connecting said worm shaft to one of said pointers in direct driving relationship, and differential gear means operatively connecting said worm shaft to the other pointer in driving relationship, said latter means including a pair of rotary input elements and a rotary output element directly connected to said latter pointer, means operatively connecting said worm shaft to one of said input elements in direct driving relationship, a carriage mounted on said worm shaft and movable axially therealong upon rotation of the latter, a rotatable splined shaft secured to and rotatable with said other input element, a rack slidably mounted on said carriage and having a toothed portion in engagement with said splined shaft, a tiltable cam member capable of assuming different positions of angularity with respect to said shaft, there being an elongated rectilinear slot in said cam member, a cam follower mounted on said carriage and projecting into said slot, a toothed segment carried by said cam member, a pinion meshing with said toothed segment, means for manually rotating said toothed pinion to move said tiltable member to a selected position of angularity, and holding means for retaining said cam member in a selected position.

12. In an apparatus of the character described, a manually rotatable driving shaft and a driven shaft, differential gear means for imparting motion from said driving shaft to said driven shaft, said differential means comprising a pair of rotary input elements and a rotary output element connected to said driven shaft, gear means directly connecting said driving shaft to one of said input elements, a worm shaft operatively connected to and adapted to be driven by said gear means, a carriage mounted on said worm shaft and movable therealong upon rotation of the latter, a splined shaft connected to said other input element and mounted for rotation therewith, a rack slidably mounted on said carriage and having a toothed portion in meshing engagement with said splined shaft, a tiltable cam element capable of assuming a plurality of different positions of angularity with respect to said worm shaft, there being an elongated rectilinear slot formed in said tiltable cam element, a cam protuberance mounted on said rack and extending into said slot, means for selectively moving said movable cam element to any one of its angular positions, and yieldable means for maintaining said movable cam element in any selected position.

13. In an apparatus of the character described, a plurality of rotatable worm shafts, means operatively connecting said worm shafts for rotation in unison, an additional shaft, differential gear means connecting one of said worm shafts to said additional shaft comprising a pair of rotary input elements and a rotary output element connected to said additional shaft, a carriage mounted on said worm shafts and movable axially therealong upon rotation of the latter, a splined shaft connected to one of said input elements and mounted for rotation therewith, a rack slidably mounted on said carriage for movement laterally of said worm shafts and having a toothed portion in meshing engagement with said splined shaft, cam means operable upon movement of said carriage for shifting the position of said rack relative to the carriage to impart a component of motion to the splined shaft, and means operatively connecting one of said worm shafts to said other input element in driving relationship, said worm shafts all having threads of equal pitch.

REYNOLD B. JOHNSON.
CLINTON E. LARRABEE.

REFERENCES CITED

The following references are of record in the file of this patent:

UNITED STATES PATENTS

| Number    | Name       | Date          |
|-----------|------------|---------------|
| 706,554   | Hall       | Aug. 12, 1902 |
| 818,945   | Fetters    | Apr. 24, 1906 |
| 1,161,572 | Woodhull   | Nov. 23, 1915 |
| 1,389,382 | Rigsby     | Aug. 30, 1921 |
| 1,499,664 | Kaminski   | July 1, 1924  |
| 2,273,652 | Maxson et al. | Feb. 17, 1942 |